(12) United States Patent
Arora et al.

(10) Patent No.: US 9,648,357 B2
(45) Date of Patent: May 9, 2017

(54) METHOD AND DEVICE FOR PROVIDING A VIDEO STREAM FOR AN OBJECT OF INTEREST

(71) Applicant: ATI TECHNOLOGIES, ULC, Markham, Ontario (CA)

(72) Inventors: Jitesh Arora, Markham (CA); Gagandeep Singh Chabbewal, Brampton (CA); Randall A. Brown, Toronto (CA); Jamin Islam, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 588 days.

(21) Appl. No.: 13/668,636

(22) Filed: Nov. 5, 2012

(65) Prior Publication Data

US 2014/0130079 A1    May 8, 2014

(51) Int. Cl.
*H04N 21/218* (2011.01)
*H04N 21/2187* (2011.01)
*H04N 21/234* (2011.01)
*H04N 21/2743* (2011.01)
*H04N 21/472* (2011.01)
*H04N 21/84* (2011.01)
*G06F 17/30* (2006.01)

(52) U.S. Cl.
CPC . *H04N 21/21805* (2013.01); *G06F 17/30823* (2013.01); *G06F 17/30837* (2013.01); *H04N 21/2187* (2013.01); *H04N 21/23418* (2013.01); *H04N 21/2743* (2013.01); *H04N 21/47202* (2013.01); *H04N 21/84* (2013.01)

(58) Field of Classification Search
None
See application file for complete search history.

(56) References Cited

U.S. PATENT DOCUMENTS

| 7,296,284 B1* | 11/2007 | Price et al. ............... 725/39 |
| 2007/0174872 A1* | 7/2007 | Jing et al. ............... 725/46 |
| 2007/0250864 A1* | 10/2007 | Diaz Perez ............... 725/52 |
| 2008/0086750 A1* | 4/2008 | Yasrebi et al. ............... 725/86 |
| 2009/0063419 A1* | 3/2009 | Nurminen et al. ............... 707/3 |
| 2009/0216745 A1* | 8/2009 | Allard ............... 707/5 |
| 2010/0125880 A1* | 5/2010 | Roewe ............... 725/87 |
| 2011/0289530 A1* | 11/2011 | Dureau et al. ............... 725/38 |
| 2012/0185904 A1* | 7/2012 | Dey ............... 725/87 |

OTHER PUBLICATIONS

"Automatic Segmentation of Moving Objects in Video Sequences: A Region Labeling Approach," Tsaig et al., IEEE Transactions on Circuits and Systems for Video Technology, vol. 12, No. 7, Jul. 12002, pp. 597-612.

(Continued)

*Primary Examiner* — Nathan Flynn
*Assistant Examiner* — Michael Telan
(74) *Attorney, Agent, or Firm* — Faegre Baker Daniels LLP

(57) ABSTRACT

A method and device for ranking video feeds provide a user with the best feed depending on what the user wishes to see. The method includes obtaining one or more video feeds and ranking the video feeds. The ranking is based, at least in part, upon input from a viewer indicating an object of interest. The ranking can consider things such as video stream resolution and signal strength.

16 Claims, 5 Drawing Sheets

(56) References Cited

OTHER PUBLICATIONS

"Fast Video Object Selection for Interactive Television," Trichet et al., 2006 IEEE, ICME 2006, pp. 989-992.
Website: www.ingentaconnect.com/content/asp/asl/2012/00000009/00000001/art00020—"Static Object of Interest Recognition from Video Streams for Effective Visualization in Small Hand-Held Displays," Hasan et al., dated Nov. 5, 2012.
"People detection and re-identification for multi surveillance cameras," Corvee et al., hal-00656108, version 1, Jan. 3, 2012, 7 pages.

\* cited by examiner

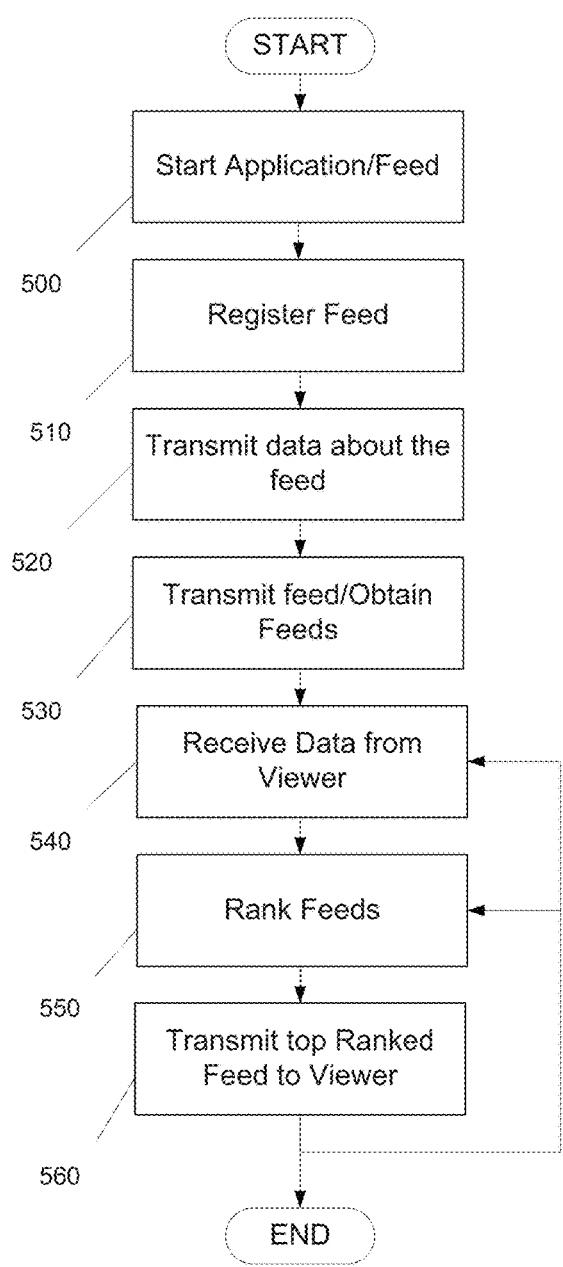
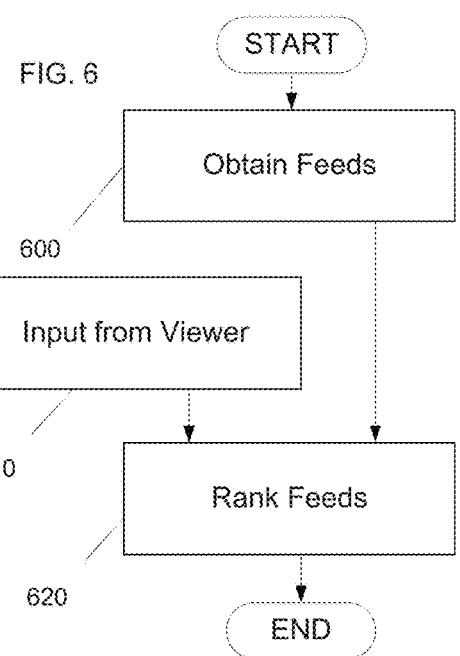
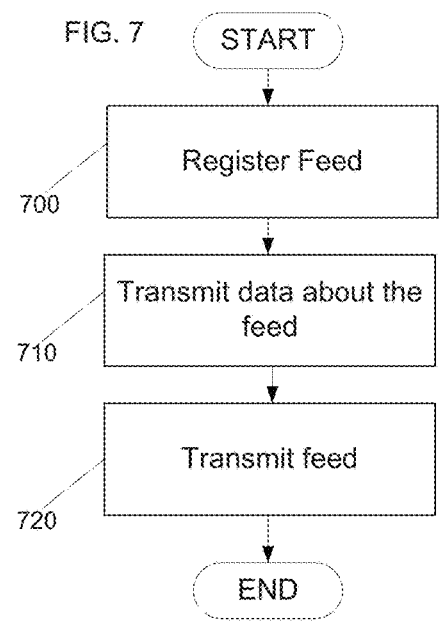
FIG. 5
FIG. 6
FIG. 7

METHOD AND DEVICE FOR PROVIDING A VIDEO STREAM FOR AN OBJECT OF INTEREST

FIELD OF THE DISCLOSURE

The present disclosure is related to methods and devices for organizing multiple video media source streams of an event. The present disclosure is related more specifically to methods and devices for receiving and providing a user a video media stream of an event selected from multiple video media streams of the event based on inputs from the user.

BACKGROUND

Video recording and transmitting devices are now present in most smartphones. Given the proliferation of these smartphones, at most any gathering of people (social event, sporting event, political rally, etc.) many smartphones are present. Each smartphone (or other device with video capture and transmission capability) presents a potential video media source whose subject is some portion or all of its surroundings.

Using the example of a sporting event, one camera may be trained on the stadium as a whole, one camera trained on a certain player, one camera trained on a certain point on a field, one camera trained on the scoreboard, etc. Furthermore, each camera may be different and may be capable of producing different quality of video (resolution, refresh rate, etc.) Still further, the camera operators may be amateurs or professionals, may be using a fixed camera (such as with a tripod) or free handing, and likely have differing viewing angles that provide differing qualities of views of various objects/places/people/events.

While such streams are being generated and even transmitted in real time, publishing of such streams occurs at a multitude of disparate locations (both online and through traditional television media outlets). While internet search engines operate reasonably well to catalog recorded video media, the real-time nature of video streaming from a live event does not lend itself to traditional cataloging and indexing that allows for a user to locate the video. Accordingly, for many video streams that are provided to the internet, such streams are not indexed or organized such that a user could readily find the video streams.

If a user would happen upon a stream from an event that interests the user, the user would still be without information as to whether another feed exists and whether the other feed provides increased signal quality. The user would further be without information as to whether another video feed exists that provides a better view of a particular part of the event that the user is particularly interested in. It should be appreciated that "video feed" as used herein describes a stream of data that, when processed, provides a video image of an event that is occurring contemporaneously with the transmission of the data. Stated differently, a video feed is a "live feed." However, it is understood that transmission delays are part of any video system and thus, the concept of "live" and "video feed" does not require real time display to the millisecond.

Currently, online video streaming requires a website that is set up beforehand such that the website knows that a camera is going to be operating at an event and the camera operator specifically transmits his/her video to be shared on that website. Thus, spontaneous decisions to create a video stream are not supported in a way that is readily locatable by viewers.

Still further, except for those individuals providing video feeds as part of their employment, the generation of video feeds relies on users generating the feeds for enjoyment or general benevolence.

Accordingly, there exists a need for a device and method to provide for real time organization of video media feeds. There further exists a need for a device and method of providing information regarding existing video feeds and optimizing the selection of feed from multiple feeds. Still further there exists a need for a system and method to reward and incentivize the creation of such video streams.

BRIEF DESCRIPTION OF THE DRAWINGS

FIG. 5 is a flowchart describing operation of the system of FIG. 2 according to an embodiment of the present disclosure;

FIG. 6 is a flowchart showing an exemplary operation of the clearinghouse of FIG. 2 according to an embodiment of the present disclosure; and FIG. 7 is a flowchart showing exemplary operation of the process of registering a feed with the clearinghouse of FIG. 2 according to an embodiment of the present disclosure.

DETAILED DESCRIPTION OF EMBODIMENTS

In an exemplary and non-limited embodiment, aspects of the invention are embodied in a method of ranking video feeds to provide a user with the best feed depending on what the user wishes to see. The method includes obtaining one or more video feeds and ranking the video feeds. The ranking is based, at least in part, upon input from a viewer indicating an object of interest. The ranking can consider things such as video stream resolution and signal strength.

In another exemplary embodiment, a system for providing a video feed to a viewer is provided including a feed receiver operable to receive at least one video feed; a viewer input receiver operable to determine an object of interest to the viewer; a feed analyzer operable to determine at least one of features of and content of each received feed; and a feed ranker operable to consider the object of interest and at least one of the features of and content of each received feed to provide a ranking of received feeds.

In another exemplary embodiment, a method of providing a video feed to one or more users is provided including: registering a video feed with a feed aggregator; transmitting data identifying a subject of the video feed to the feed aggregator; and transmitting the video feed to the feed aggregator.

In another exemplary embodiment, a computer readable medium containing non-transitory instructions thereon is provided, that when interpreted by at least one processor cause the at least one processor to obtain one or more video feeds and rank the video feeds. The ranking is based, at least in part, upon input from a viewer indicating an object of interest, the ranking providing a top ranked video feed.

Figure 1:
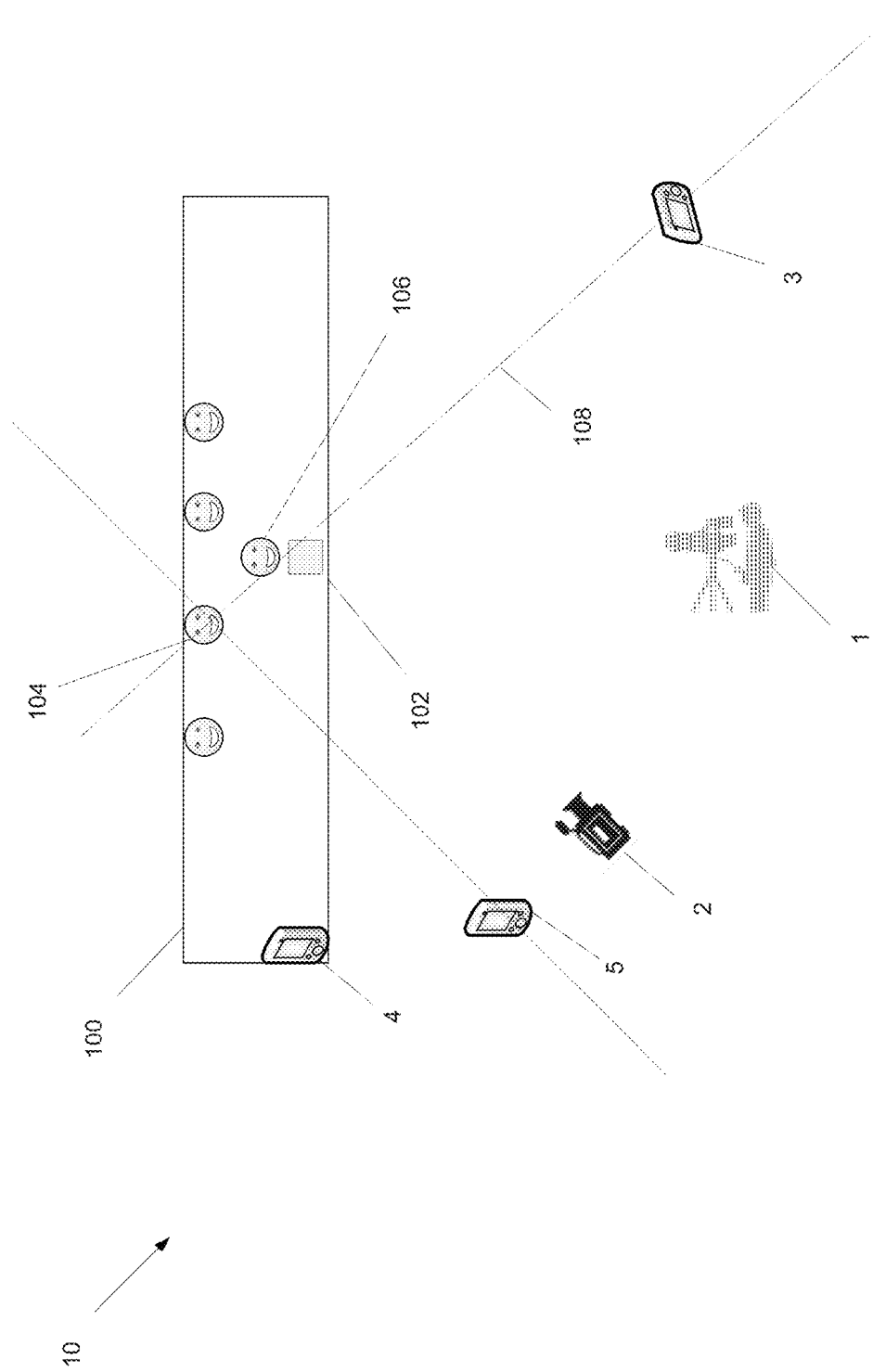
FIG. 1 is a diagram of an exemplary location where multiple video media streams are created according to an embodiment of the present disclosure.

FIG. 1 shows a diagram of an event location 10 (political rally) that multiple individuals are attending and one or more of those individuals 1, 2, 3, 4, 5 have or are operating video recording and transmission devices. Location 10 includes stage 100, podium 102, first presenter 104, and second presenter 106.

For purposes of this disclosure, individuals operating recording devices are referred to as content collection users. Individual 1 is operating a professional grade camera on behalf of a television network or other professional media outlet. Individual 2 is operating a professional grade camera as an independent freelance reporter. Individual 3 is operating a smart phone as a video recorder and is an attendee from the general public. Individual 4 is operating a smart phone as a video recorder and is an attendee associated with the presenter. Individual 5 is operating a smart phone as a video recorder and is an attendee from the general public.

Figure 2:
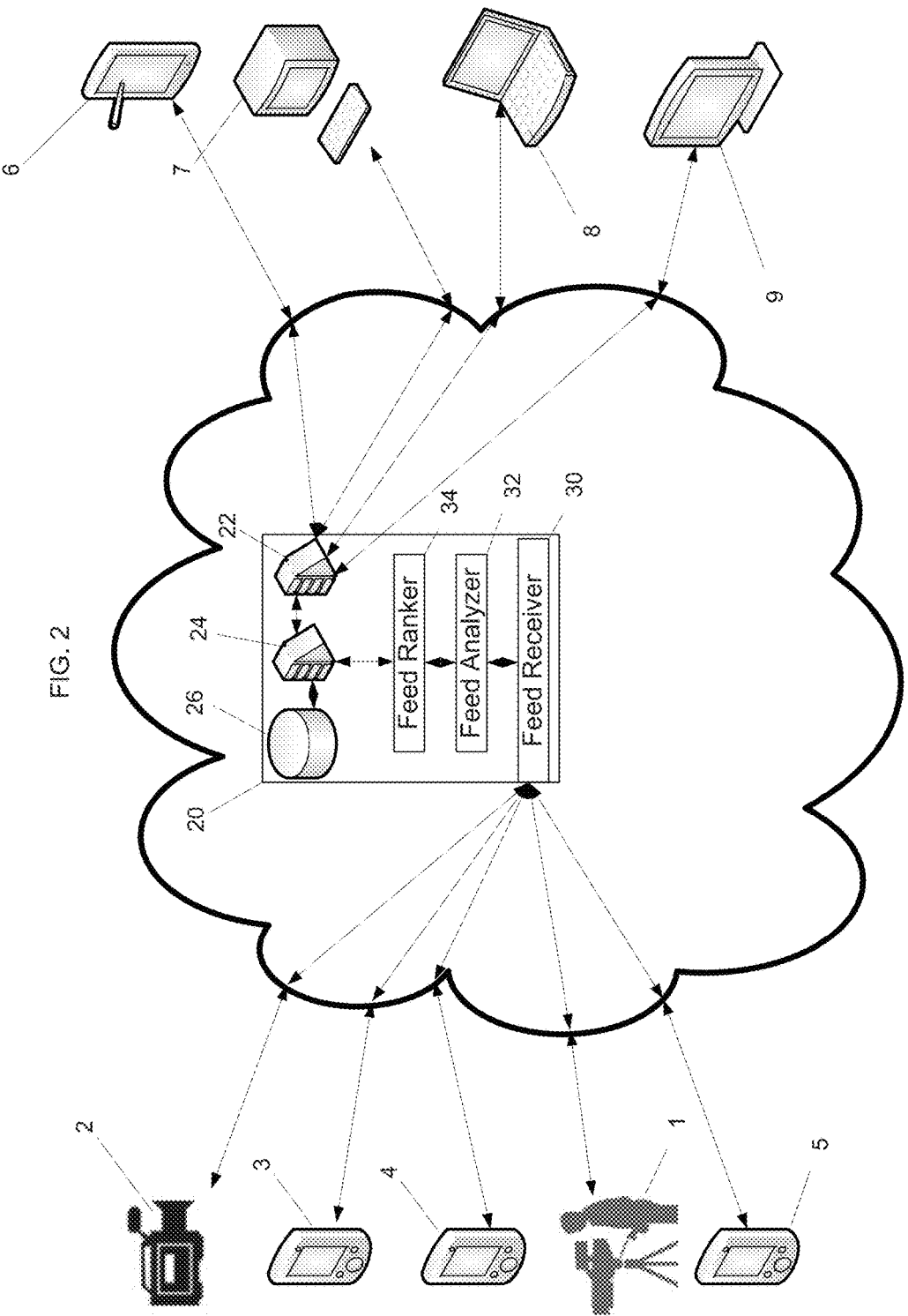
FIG. 2 is a diagram showing interaction with a video stream clearinghouse according to an embodiment of the present disclosure.

FIG. 2 shows a system that interfaces with the feeds generated by content collection users 1-5 (the feeds will also be referred to as 1-5) to provide a collection point and clearinghouse 20 (or aggregator) that makes feeds 1-5 available to viewers via viewing devices 6-9. Clearinghouse 20 illustratively includes a web server 22 that interfaces with web clients, an application server 24 that runs applications, and a database 26 that stores data for use by the application server.

In one embodiment, content collection users 1-5 register their feed, block 700, FIG. 7. Data about the feed is then transmitted to clearinghouse 20, block 710. The feed itself is then transmitted to the clearinghouse or elsewhere, block 720.

Figure 3:
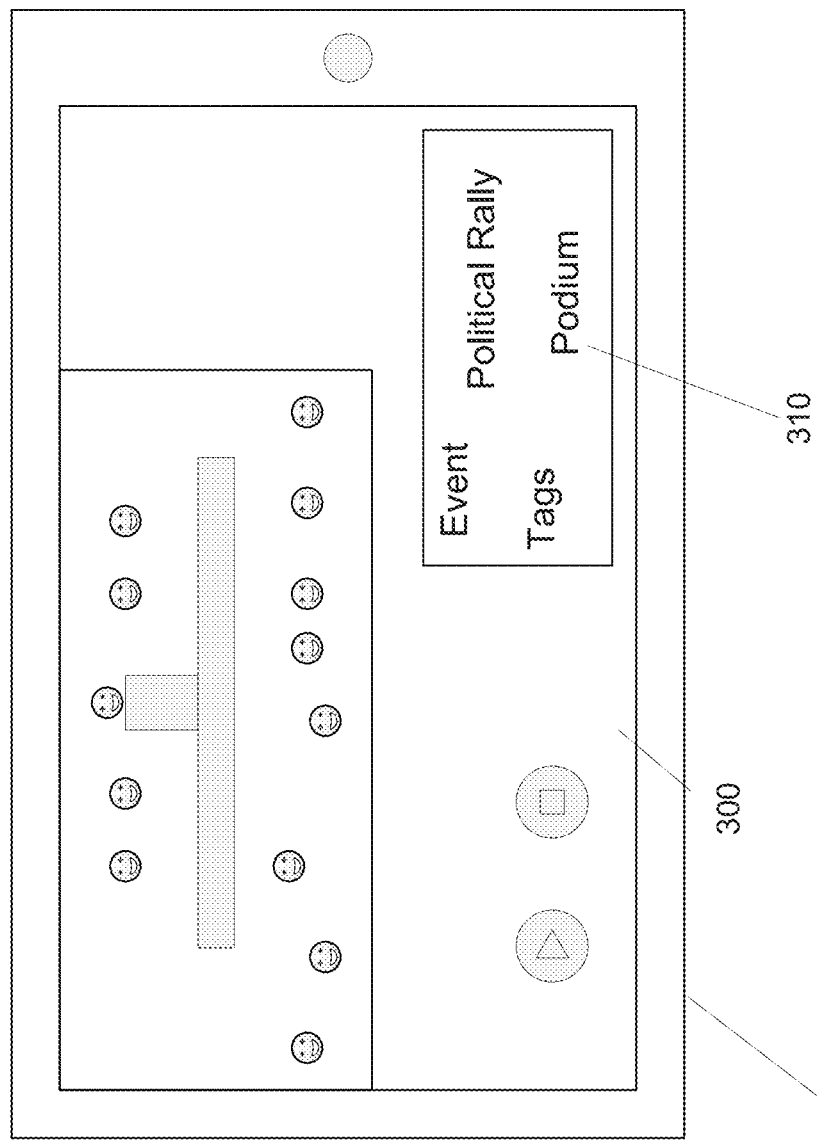
FIG. 3 is a smartphone running an application operable to interact with the clearinghouse of FIG. 2 according to an embodiment of the present disclosure.

In another embodiment, content collection users 1-5 start an application or feed, block 500, FIG. 5. Content collection users 1-5, or someone operating on their behalf, then registers their feeds with clearinghouse 20, block 510. To aid in this, content collection user 1-5 can invoke application 300 on the device generating the stream, such as a smartphone as shown in FIG. 3, to instruct that the feed be provided to clearinghouse 20. Alternatively, for feeds that are not generated by a device capable of running applications, such as professional cameras 1, 2, web addresses of the feeds can be registered by others via computers and websites (i.e., via an intermediary) provided for interfacing with clearinghouse 20.

Registering feeds 1-5 also includes providing information about the content of the feeds, block 520 of FIG. 5. In one embodiment, application 300 provides for location based tagging of the feed. Such embodiment can be similar to the location creation and "check-in" afforded by FourSquare and Facebook or can employ hash tags as commonly used on Twitter. These tags 310 can also be applied by users viewing the feeds (viewing users) via programs/websites on viewing devices 6-9. Still further, metadata associated with feeds 1-5 may have location data (e.g., GPS type data and/or orientation data) associated therewith that can be used to associate the data with a particular event.

In addition to identifying the event that is the subject of the feed, a more specific subject can be identified. In the example of FIG. 1 and an exemplary interface shown in FIG. 3, feed 1 is tagged as being statically focused on podium 102. Feed 2 is tagged as being dynamically focused on person 106. Feeds 3 and 5 are tagged as being dynamically focused on person 104. Feed 4 may have no tagging. Clearinghouse 20 is thus provided with information regarding the location and the focus of the provided feeds. Alternatively, if a specific focus is not identified, another application (e.g., clearinghouse 20) can apply analysis operations to the feed to make its own assessment of the focus of the feed. Examples of another application which can apply analysis algorithms can be local to the device associated with the viewer (i.e., viewing device 7) or be performed, a suggested above, by a networked device such as clearinghouse 20. Examples of such analysis operations include those described in "Static Object-of-Interest Recognition from Video Streams for Effective Visualization in Small Hand-Held Displays" Hasan, M. Abul; Lee, Seok-Lyong; Kim, Deok-Hwan; Advanced Science Letters, Volume 9, Number 1, April 2012, pp. 126-131(6); "People detection and re-identification for multi surveillance cameras" Etienne Corvee, Slawomir Bak and Francois Bremond, VISAPP—International Conference on Computer Vision Theory and Applications—2012 (2012); "Automatic segmentation of moving objects in video sequences: a region labeling approach;" Tsaig, Y., Averbuch, A.; Circuits and Systems for Video Technology, Volume: 12, Issue: 7, Page(s): 597-612; and "FAST VIDEO OBJECT SELECTION FOR INTERACTIVE TELEVISION;" Multimedia and Expo, 2006 IEEE International Conference; Trichet, R., Sophia Antipolis; Page(s): 989-992. Still further, embodiments are envisioned where a user watching one feed 1-5 can select an object by clicking on that object in the video feed. Operations, such as the above listed operations, would then analyze the available feeds to find the feed that provides the best view of that object (while considering the other inputs regarding video quality, signal quality, etc.). Still further, upon identifying the event, the application can present a list of topics and objects of interest that are commonly found and of interest at such events. Content creation users 1-5 can then select from the provided tag options or create their own.

Content creation users 1-5 can further specify whether they want to provide their stream free of charge or subject to a charge (including an amount and term, such as per hour or per event). In addition to providing information about the subject of the feed, additional data about the feed is also provided to clearinghouse 20. Such additional data includes feed quality metrics (resolution, frame rate, color depth, content provider signal quality/strength, content provider signal speed, frame drop information, quality of companion audio with the video, and existence of companion audio with the video) and any other metric that impacts the quality and/or desirability of the feed (including whether the feed provides a shaky or steady picture). Such data is illustratively provided as metadata within feeds 1-5 to the extent possible.

In one embodiment, the transmitted feeds 1-5 are obtained by clearinghouse 20 or otherwise, block 600, FIG. 6. At some point, input from the user, such as identification of an object of interest or viewing device specifications are provided to clearinghouse, block 610. The feeds and viewer input are compared to rank the feeds, block 620.

In another embodiment, feeds are transmitted to clearinghouse 20, block 530 of FIG. 5. Accordingly, clearinghouse 20 obtains the feeds, with information from one or more of content collection users 1-5 (via tagging or otherwise), from content collection devices 1-5 (via metadata or otherwise), from users of viewing devices 6-9 and from operations that analyze feeds 1-5.

Clearinghouse 20 includes servers and databases that provide processing of feeds 1-5 and provide websites that present feeds 1-5 and feed options. "Websites" is used as a generic term that describes any presentation medium that allows for input from a viewing user.

Figure 4:
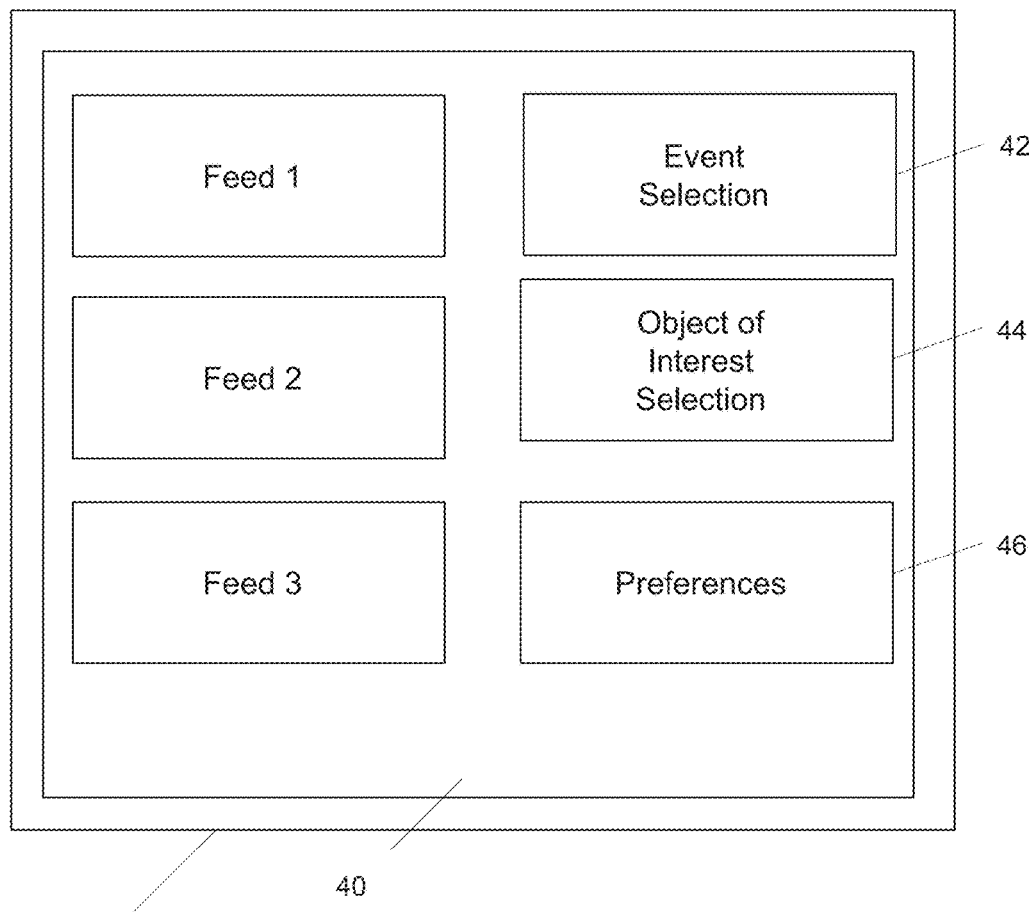
FIG. 4 is a computer running an application operable to interact with the clearinghouse of FIG. 2 according to an embodiment of the present disclosure.

Viewing device 7, including an exemplary interface 40, is shown in FIG. 4. A viewing user is able to search via button 42, for a particular event for which he/she wishes to view video streams. Furthermore, the viewing user is able to specify an object of interest at button 44, block 540 of FIG. 5. By way of the example of FIG. 1, an object of interest can be a fixed location or object such as podium 102. The object of interest can further be a person such as presenters 104, 106, or (in another setting such as a sporting event) a moving object such as a soccer ball. In one embodiment, viewing user is presented with a list of objects or angles that have been tagged by one of feeds 1-5 from which to select.

The viewing user is further presented with the ability to enter preferences at button 46, as to the relative importance of various factors such as stream resolution, stream quality, ideal viewing angle, whether the stream is a free or pay stream, and other factors. Each of the above inputs along with the display capabilities of the panel on which the stream is to be displayed are provided to clearinghouse 20. The feeds themselves are illustratively supplied to clearinghouse 20 via feed receiver 30 (FIG. 2). While the disclosure herein discusses that various processing is performed at clearinghouse 20, it should be appreciated that embodiments are envisioned where such processing is performed at other locations, such as viewing devices 6-9. It is anticipated that feeds 1-5 are of differing quality. Clearinghouse 20 is also appraised of its ability and the ability of the employed viewing device 6-9 to apply operations to the feed to "clean up" that feed. Thus, a more accurate way to consider the quality of the feeds is inclusive of the improvements (e.g., post-processing effects) that can be made to each of the feeds without significantly impacting the real-time nature of the feeds 1-5. Similar analysis is included for things like the ability to stabilize a shaky feed.

Given the inputs from sources 1-5, the viewer, and viewing devices 6-9, clearinghouse 20 subjects the inputs to feed analyzer 32 (FIG. 2), illustratively including an algorithm, to the rank, illustratively via feed ranker 34 (FIG. 2), block 550 of FIG. 5, and select a feed or feeds from the available feeds that best fits the needs of the viewer.

By way of example, if the viewer is viewing on a smartphone or tablet 6, then getting a feed 1-5 that has a resolution of 1080p may not be important because the viewing device may not support such a high resolution anyway. Similarly, a smartphone may be operating over a data connection that cannot handle a data rate that is required to transmit video having 1080p resolution in real time. Still further similarly, for a viewer wishing to focus on first presenter 104, feed 3 would be ranked lower in that the viewing angle/line of sight 108 of feed 3 provides that podium 102 and second presenter 106 block camera 3's view of first presenter 104. (Embodiments are envisioned where feed 3 is tagged as being blocked with respect to first presenter 104 and where video analysis is performed to determine that feed 3 presents a poor view of first presenter 104). It should be appreciated that feed 3's view of first presenter 104 is not a static quality due to the ability of the presenter 104 to move and the potential for other moving objects to obscure the view. Accordingly, in embodiments, including where an algorithm determines feed 3's suitability to view presenter 104, the analysis of feed 3's suitability to view presenter 104 is ongoing and constantly re-evaluated. Furthermore, embodiments are envisioned where viewer feedback rankings of the feed are considered in the ranking. Given the inputs, viewing device 7 then presents one or more feeds 1-5 (such as the most highly ranked feed) to a user to be watched simultaneously, or from which to select a single feed 1-5, FIG. 4, block 560.

Additionally, given the constant re-evaluation, embodiments are envisioned where multiple feeds are stitched together such that a viewer is automatically provided different (switched) feeds depending on the algorithm determining that different feeds are better. Thus, a user would not need to select a different feed to be switched to a more optimal feed. Examples include attempts to follow a particular race car around a track where a single vantage point cannot capture the entire track (or can capture the whole track but other feeds provide better views when the car is at certain parts of the track). Accordingly, a viewer who has selected that car as an object of interest in effect selects a "channel" dedicated to that car and the algorithm switches the presented feed based upon the changing conditions of which feed currently provides the best view thereof.

Embodiments are envisioned where a content creation user is provided with a notification (such as a light on the application) when his/her feed is being viewed by a viewer. Accordingly, a content creation user is provided with feedback as to whether his/her feed is being consumed by a viewer. Still further, embodiments are envisioned where viewers can enter information regarding their objects of interest, and such information can be available via the application. Thus, a content generating user can see what objects viewers are interested in. Still further, embodiments are envisioned where viewers can bid or offer compensation for content creators to create streams that focus on objects of interest to the offering viewer. Content-creating users can then claim the offers and start generating a requested feed. Still further, embodiments are envisioned where the application on the smartphone has options presented to the content creator to allow them to choose the quality of the feed that they are providing. Whereas a phone may be capable of recording and transmitting 1080p, doing so is relatively power intensive compared to lower resolutions. Accordingly, a content creator may choose to record and transmit a lower resolution, such as 480p, so as to lengthen the battery life of his device.

Presentation of video feeds can be done along with advertising. This advertising can be placed alongside the feed presentation, can be made to interrupt the feed at defined intervals or can be presented when a user starts a feed. The revenue generated from such advertising can be split with the feed creator 1-5 and the clearinghouse 20 operator. Thus, individuals are incentivized to participate and to participate in a way that provides quality content that focuses on items of interest to viewers and in a way likely to be chosen by the content rating operation. Still further, feed creators 1-5 can establish fee structures for their feeds. Thus, when feeds are ranked, viewers can select whether to consider only free feeds, only pay feeds, or both. Furthermore, viewers can select to consider only feeds below a certain price point. Similarly, subscriptions can be offered to the system as a whole and there can be multiple levels of subscriptions.

Yet another factor that can be considered in ranking feeds can be the reputation of the content producer. Viewers can manually rank content producers, or computers can rank producers via algorithms. These ranks of a feed can build a ranking for the content producer. Accordingly, a subsequent feed by that content producer can benefit (or suffer) from the content producer's previous good (or bad) work.

The above detailed description and the examples described therein have been presented for the purposes of illustration and description only and not for limitation. For example, the operations described may be done in any suitable manner. The method may be done in any suitable order still providing the described operation and results. It is therefore contemplated that the present embodiments cover any and all modifications, variations or equivalents that fall within the spirit and scope of the basic underlying principles disclosed above and claimed herein. Furthermore, while the above description describes hardware in the form of a processor executing code, hardware in the form of a state machine, or dedicated logic capable of producing the same effect are also contemplated.

The software operations described herein can be implemented in hardware such as discrete logic fixed function circuits including but not limited to state machines, field programmable gate arrays, application specific circuits or other suitable hardware. The hardware may be represented in executable code stored in non-transitory memory such as RAM, ROM or other suitable memory in hardware descriptor languages such as but not limited to RTL and VHDL or any other suitable format. The executable code when executed may cause an integrated fabrication system to fabricate an IC with the operations described herein Also, integrated circuit design systems/integrated fabrication systems (e.g., work stations including, as known in the art, one or more processors, associated memory in communication via one or more buses or other suitable interconnect and other known peripherals) are known that create wafers with integrated circuits based on executable instructions stored on a computer readable medium such as but not limited to CDROM, RAM, other forms of ROM, hard drives, distributed memory, etc. The instructions may be represented by any suitable language such as but not limited to hardware descriptor language (HDL), Verilog or other suitable language. As such, the logic, software, and circuits described herein may also be produced as integrated circuits by such systems using the computer readable medium with instructions stored therein. For example, an integrated circuit with the aforedescribed software, logic, and structure may be created using such integrated circuit fabrication systems. In such a system, the computer readable medium stores instructions executable by one or more integrated circuit design systems that causes the one or more integrated circuit design systems to produce an integrated circuit.

What is claimed is:

1. A method of ranking a video feed including:
   obtaining one or more video feeds by a computing device, the video feeds depicting a first event;
   comparing the one or more video feeds to each other; and
   ranking the video feeds by the computing device, the ranking based, at least in part, upon input from a viewer indicating an object of interest that is part of the event, the ranking providing a top ranked video feed, wherein ranking a video feed as the top ranked video feed reflects the top ranked video feed's ability to depict the object of interest identified by the viewer.

2. The method of claim 1, further including providing the top ranked video feed to the viewer.

3. The method of claim 1, wherein the ranking is further based on one or more of: resolution of the feed, resolution supported by a viewing device of the viewer, frame rate of the feed, frame rate supported by the viewing device of the viewer, color depth of the feed, color depth supported by the viewing device of the viewer, feed signal quality, feed signal strength, feed content provider bandwidth, feed frame drop information, quality of companion audio with the feed, existence of companion audio with the feed, audio capabilities of the viewing device of the viewer and whether the feed provides a steady picture.

4. The method of claim 1, wherein the video feeds include a feed from a personal mobile device.

5. The method of claim 1, wherein the input is one where the viewer has selected an item from within one of the video feeds.

6. The method of claim 1, further including compensating a creator of the top ranked feed.

7. The method of claim 1, wherein at least one of the one or more video feeds is a feed for which the viewer incurs a charge to view.

8. A system for providing a video feed to a viewer including:
   a feed receiver operable to receive multiple video feeds depicting an event;
   a viewer input receiver operable to determine an object of interest to the viewer that is part of the event;
   a feed analyzer operable to determine at least one of features of and content of received feeds;
   comparing at least one or more video feeds of the multiple video feeds to each other; and
   a feed ranker operable to consider the object of interest and at least one of the features of and content of the received feeds to provide a ranking of received feeds.

9. The system of claim 8, wherein the input receiver, feed analyzer, and feed ranker are provided via a combination of a web server, an application server, and a database.

10. The system of claim 8, wherein the ranking of received feeds reflects each feed's correlation to the object of interest and quality of the video feed.

11. The system of claim 8, wherein the viewer input receiver is further operable to receive information about the capabilities of a panel on which the viewer views feeds, and the panel capability information is used by the feed ranker to rank feeds.

12. A computer readable medium containing non-transitory instructions thereon, that when interpreted by at least one processor cause the at least one processor to:
    obtain one or more video feeds, the video feeds depicting a first event;
    comparing the one or more video feeds to each other; and
    rank the video feeds, the ranking based, at least in part, upon input from a viewer indicating an object of interest, the ranking providing a top ranked video feed, wherein ranking a video feed as the top ranked video feed reflects the top ranked video feed's ability to depict the object of interest identified by the viewer.

13. The computer readable medium of claim 12, wherein the instructions are embodied in hardware description language suitable for one or more of describing, designing, organizing, fabricating or verifying hardware.

14. The computer readable medium of claim 12, wherein the instructions further cause the processor to provide the top ranked video feed to the viewer.

15. The computer readable medium of claim 12, wherein rankings of feeds by viewers of the feeds are used in ranking the feeds.

16. The computer readable medium of claim 12, wherein the video feeds contain subject matter that is occurring contemporaneously to the time at which the video feeds are obtained and ranked.

* * * * *